United States Patent [19]

Plicht et al.

[11] Patent Number: 4,648,314
[45] Date of Patent: Mar. 10, 1987

[54] WAFER BAKING AUTOMATIC MACHINE

[75] Inventors: Hans-Jurgen Plicht, Langen; Heinrich Runkel, Erzhausen, both of Fed. Rep. of Germany

[73] Assignee: Hebenstreit GmbH, Moerfelden-Walldorf, Fed. Rep. of Germany

[21] Appl. No.: 616,430

[22] Filed: May 31, 1984

[30] Foreign Application Priority Data

Jun. 1, 1983 [DE] Fed. Rep. of Germany ....... 3319886
Dec. 24, 1983 [DE] Fed. Rep. of Germany ....... 3346970

[51] Int. Cl.⁴ ............................................. A47J 37/01
[52] U.S. Cl. ........................................ 99/373; 99/374; 99/443 C; 99/447; 126/41 C
[58] Field of Search ............. 99/373, 374, 447, 443 C, 99/423; 432/137, 148, 140; 34/236; 219/386; 126/39 H, 39 K, 41 C

[56] References Cited

U.S. PATENT DOCUMENTS

| | | | |
|---|---|---|---|
| 1,552,834 | 9/1925 | Fitch | 432/148 |
| 1,757,556 | 5/1930 | Benebinisti | 99/373 |
| 2,139,334 | 12/1938 | Rebois | 99/373 |
| 2,624,297 | 1/1953 | Nuttall | 99/373 |
| 2,745,363 | 5/1956 | Balton | 99/373 X |
| 3,458,686 | 7/1969 | Gvozdjak | 99/447 X |
| 3,812,775 | 5/1974 | Sijbring | 99/443 C X |
| 3,823,666 | 7/1974 | Nerthling | 99/443 C |
| 4,176,589 | 12/1979 | Stuck | 99/443 C X |
| 4,297,942 | 11/1981 | Benson et al. | 99/443 C X |
| 4,389,562 | 6/1983 | Chaudoir | 219/308 |

Primary Examiner—Harvey C. Hornsby
Assistant Examiner—Frankie L. Stinson
Attorney, Agent, or Firm—Michael J. Striker

[57] ABSTRACT

In a wafer baking automatic machine, a baking chamber is subdivided by separating wall into an inwardly located heating zone containing a heating burner and baking clamps of an endless chain, and a flushing zone containing guiding rails and guiding rollers of the baking clamps movable on the guiding rails, an air supply conduit opens into the heating zone and the flushing zone, and air passages are provided between baking plates of the clamps and side parts of the clamps. Flushing air is supplied into the baking chamber and discharge gas is withdrawn from the latter, wherein the flushing air is admixed prior to its supply into the baking chamber with at least a part of the discharge gas.

12 Claims, 6 Drawing Figures

WAFER BAKING AUTOMATIC MACHINE

BACKGROUND OF THE INVENTION

The present invention relates to a wafer baking automatic machine. More particularly, it relates to a wafer baking automatic machine which has a housing including housing side walls and a housing cover defining a baking chamber, an endless rotatable chain of baking clamps movable in the baking chamber and having baking plates and guiding rollers guided on guiding rails, heating burners arranged to heat the baking plates, and an air supply conduit in a lower region of the baking chamber and at least one air discharge conduit in the housing cover.

Wafers and similar baking goods are baked in an automated working cycle in wafer baking automatic machines. After filling of dough between the baking plates the closed baking clamps pass through the baking chamber and are heated by the heating burner. In order to retain the required energy consumption as low as possible, it is known in such a wafer baking automatic machine to arrange in a discharge stack a heat exchanger for a heat recovery so that a fresh air supplied to the heating burner is pre-heated in the heat exchanger. Such construction is disclosed in the German Patent No. 2,448,902.

High preheating of the supplied air is, however, to be retained within certain limits since this air as a so-called flushing air must be cooled through the bearing of the guiding rollers of the baking clamps and the hinges of the baking clamp. The heating action of the heating burner is affected so that the hot discharge gas produced by the heating burners is mixed with the flushing air which has a substantially lower temperature. To the contrary, the temperature of the flushing air increases during mixing with the discharge gases of the heating burner first of all in the upper region of the baking chamber so that here the temperature load of the bearing points and material is especially high and reaches the permissible limit.

The walls surrounding the insulation of the baking chamber must satisfy high requirements since the temperature acting in the baking chamber and determined by the baking process must be insulated from the surroundings. The thus produced high temperature difference requires not only high expenses for the insulation, but also leads to considerable heat loss.

SUMMARY OF THE INVENTION

Accordingly, it is an object of the present invention to provide a wafer baking automatic machine which avoids the disadvantages of the prior art.

More particularly, it is an object of the present invention to provide a wafer baking automatic machine which has lower heat losses and at the same time lower temperature loading of the bearing of the guiding rollers and the baking clamp hinges.

In keeping with these objects and with others which will become apparent hereinafter, one feature of the present invention resides, briefly stated, in a wafer baking automatic machine in which a separating wall separates an inwardly located heating zone containing a heating burner and baking plates from an outwardly located flushing zone containing guiding rollers for baking clamp and guiding rails, an air supply conduit opens into the heating zone and into this flushing zone and air passages are provided between the baking plates and side parts of the baking clamps.

The separate air and discharge gas flow in the region of a heating zone and in laterally arranged flushing zones allows, without affecting the heating process, to cool the guiding rollers and the baking clamp hinges with a flushing air stream whose temperature is substantially lower than the temperature in the heating zone. Since the housing side walls limit only the flushing zones and not the substantially hot heating zone, substantially lower requirements are made to the insulation of the housing side walls. Moreover, the heat loss through the housing side walls is essentially smaller.

The hot discharge gas flowing in the heating zone is forced to intensely flow around the baking plates and therefore considerably contributes to baking heat output. Mixing of the hot discharge gas with the flushing air does not place at least in the region of the baking plates. All movable parts and the bearings of the baking clamps lie outside of the heating zone in the region of the flushing zones to be cooled.

In accordance with an especially advantageous embodiment of the invention, the separating wall extends from the upper edges of the side part of the baking clamps of a lower chain portion to the upper edges of the side parts of the baking clamp of an upper chain portion. Thereby the entire hot discharge gas rising from the lower chain portion is forced to flow along the baking plates in the upper chain portion so as to heat the same. For the additional heating of the baking plates of the upper chain portion, the heating burner with the relatively small output is sufficient.

In accordance with a further feature of the present invention, the heating zone and the flushing zone are connected with a common horizontal air collecting chamber which extends along a housing cover and is separated from the latter by a cover intermediate chamber. In this construction similarly to the housing side walls, also in the region of the housing cover a temperature change is obtained so as to reduce the requirements for the insulation and the heat losses.

It is especially advantageous when the cover intermediate chamber is connected with fresh air channels which cover the inner sides of the housing side walls and are open downwardly. Thereby a further temperature decrease is obtained in the region of the housing side walls and the housing cover.

In accordance with an advantageous embodiment of the invention, a heat recovery is provided from the discharge gases flowing from the heating zone to the air supply conduit. This can be done by a heat exchanger or a partial mixture.

Since the structural and operational costs of the known heat exchanger devices in the discharge outlet conduit are relatively high, an orderly frequent cleaning of the heat exchanger from grease and ashes residues is required with the aid of special cleaning devices. In accordance with the present invention it is further provided that a heat recovery in the wafer baking automatic machine for using the heat loss is possible without the use of a heat exchanger.

This object is attained in accordance with the one embodiment of the invention so that a suction conduit of an air supply blower which opens into the baking chamber is connected with an air inlet conduit and with a discharge gas suction conduit connected with a discharge gas outlet conduit.

Whereas in the known wafer baking automatic machines the required heat quantity is taken from the fresh air supplied to the burners whose oxygen part must be as high as possible for the combustion process, the abovementioned further embodiment of the invention is based on the understanding that with the flushing air supplied into the furnace chamber with only small parts of importance as the secondary air for the combustion process, a reduction of the oxygen part can be taken into account without affecting the combustion process. Though this flushing air serves substantially for cooling of the bearing located in the baking chamber, it was recognized that in a surprising manner it is not required to maintain this temperature of the supplied flushing air as low as possible for example as a low temperature instead because of the relatively high required flushing air quantity also in the event of a high flushing air temperature which lies considerably below the allowable maximum temperature of the air to be cooled, and sufficient cooling is obtained. Because of this it is possible, without disadvantages to the combustion process and to the bearing cooling and have however the advantage of a substantial improvement of the thermal balance, to admix no oxygen containing discharge gas to the flushing air which is supplied to the baking chamber. Therefore a heat exchanger which increases the structural costs and operational costs can be dispensed with.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
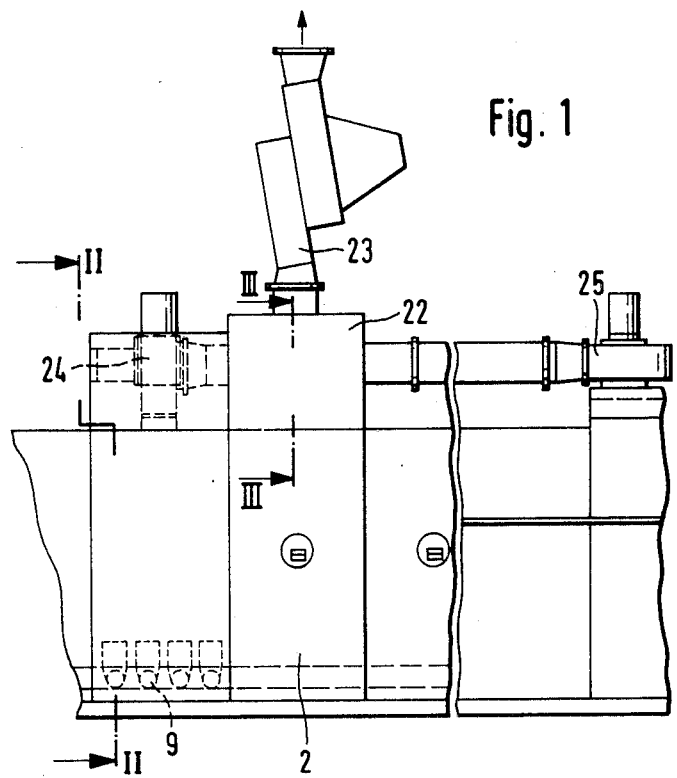
FIG. 1 is a partial side view of a wafer baking automatic machine in accordance with the present invention.
Figure 3:
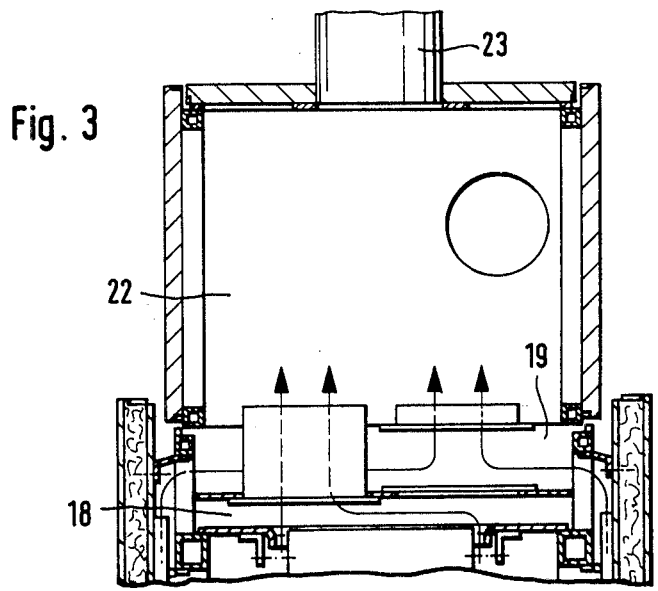
FIG. 3 is a view showing a partial section taken along the line III—III in FIG. 1.

A wafer baking automatic machine shown in FIGS. 1–4, has a baking chamber 1 enclosed by a housing 2. The housing 2 substantially includes a housing side walls 3 and a housing cover 3a. An endless rotatable chain of baking clamps 4 is arranged in the baking chamber 1. An upper chain portion and a lower chain portion in section can be seen in FIG. 2. Each baking clamp 4 has two baking plates 5 located over one another so that the wafers are baked between the baking plates. Each baking clamp 4 is provided with guiding rollers 6 which are guided on guiding rails 7 in the baking chamber 1. Heating burners 8 are arranged respectively underneath the baking clamps 4.

An air supply element 9 is arranged in a lower region of the baking chamber. Air supplied into the baking chamber 1 discharges from the air supply element 9 through a plurality of discharge openings, as identified in FIG. 2 by arrows.

A separation wall portion 10 is arranged at each side of the lower heating burner 8 and composed of sheet metal. The separating wall portion 10 extends to the lower edges of side walls 11 of the baking clamps 4 of the lower chain portion. Thereby hot gases generated by the lower heating burners 8 is forcibly and completely introduced into the baking clamps 4 of the lower chain portion. The hot gas flows around the baking plate 5, whereas air passages 12 are provided between the baking plates 5 and the side parts 11 of the clamps 4, advantageously over the entire width of the baking plates 5.

Substantially vertical separating walls 13 extend from the upper edges of the side parts 11 of the baking clamps 4 of the lower chain portion, to the lower edges of the side parts 11 of the respective opposite baking clamps 4. The upper heating burners 8 are located in the separating walls 13. Similarly to the lower chain portion, the hot gas is supplied to the upper chain portion so that its placed around the baking plate 5 inside the side parts 11 of the baking clamps 4.

Figure 2:
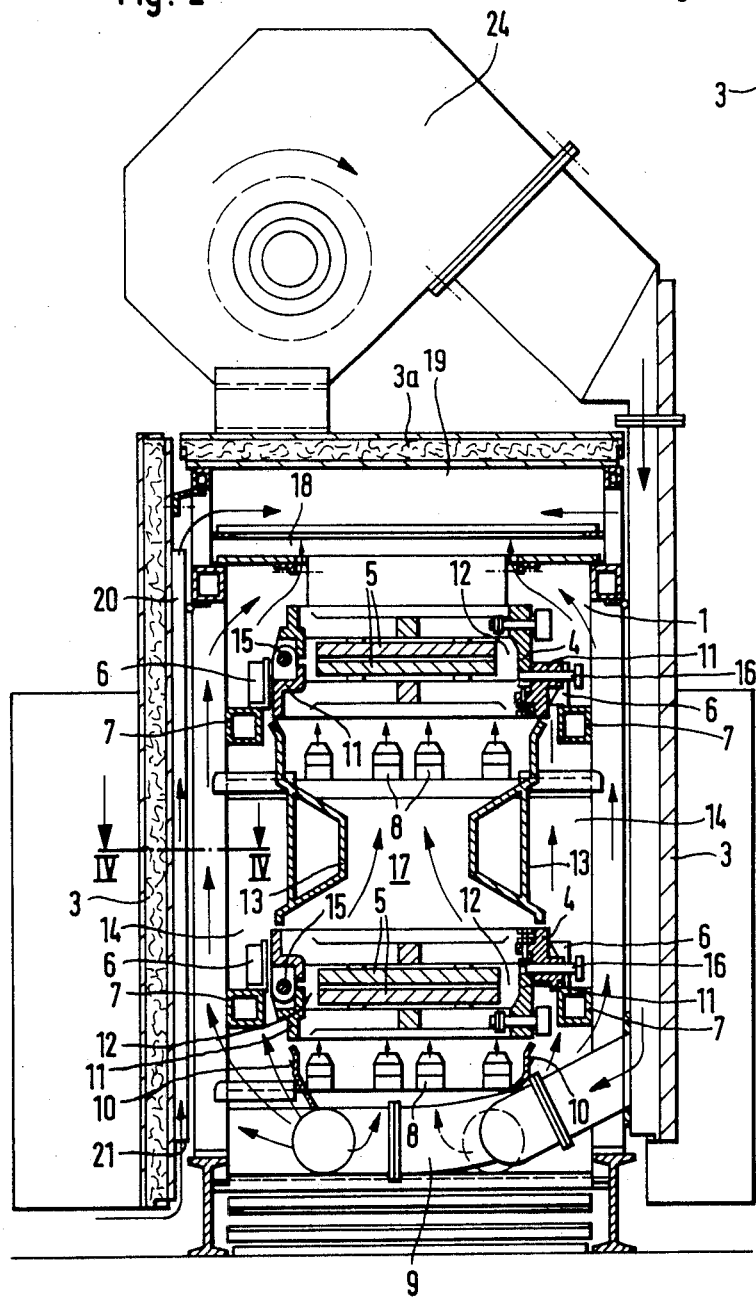
FIG. 2 is a view showing a section taken along the line II—II in FIG. 1 on an enlarged scale.
Figure 4:
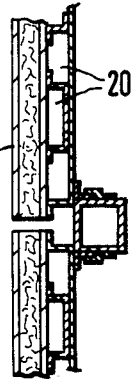
FIG. 4 is a view showing a section taken along the line IV—IV in FIG. 2.

As can be seen from FIG. 2, a part of the air discharged from the supply element 9 flows as a combustion air to the heating burners 8. The greater part of the discharged air, flows, however, into lateral flow zones 14 located between the separating walls 13 and the housing side walls 3 and pass there along the rollers 6 so as to cool their bearings. As can be seen from FIG. 2, clamp hinges 15 and clamp locks 16 of the baking clamps 4 are also located in these flushing zones 14 and therefore cooled.

A central heating zone 17 located between the separating walls 13 and having a temperature of approximately 350° C. is substantially separated from the flushing zones 14 lying at both sides thereof in which the temperature rises to approximately 160° C. Gas and air streams discharged from the heating zone 17 and the flushing zone 14 are mixed above the baking chamber 1 in a common horizontal air collecting chamber 18. The air collecting chamber 18 extends along the housing cover 3 and is separated from the latter by a cover intermediate chamber 19. Fresh air channels 20 shown in FIG. 4 open at both sides into the cover intermediate chamber 19. These channels cover the inner sides of the housing side walls 3 and have at their lower ends fresh air inlet openings 21. The horizontal air collecting chamber 18 and the upwardly located cover intermediate chamber 19 communicate with a common mixing chamber 22 shown in FIG. 3, from which common chamber a discharge gas outlet opening 23 extends. The mixing chamber 22 is connected via a supply blower 24 with the air supply element 9 for the baking chamber 1. A fresh air blower 25 is also connected with the mixing chamber 22. The heat recovery from the hot discharge gases is performed here by a partial mixing with the supplied fresh air.

Figure 5:
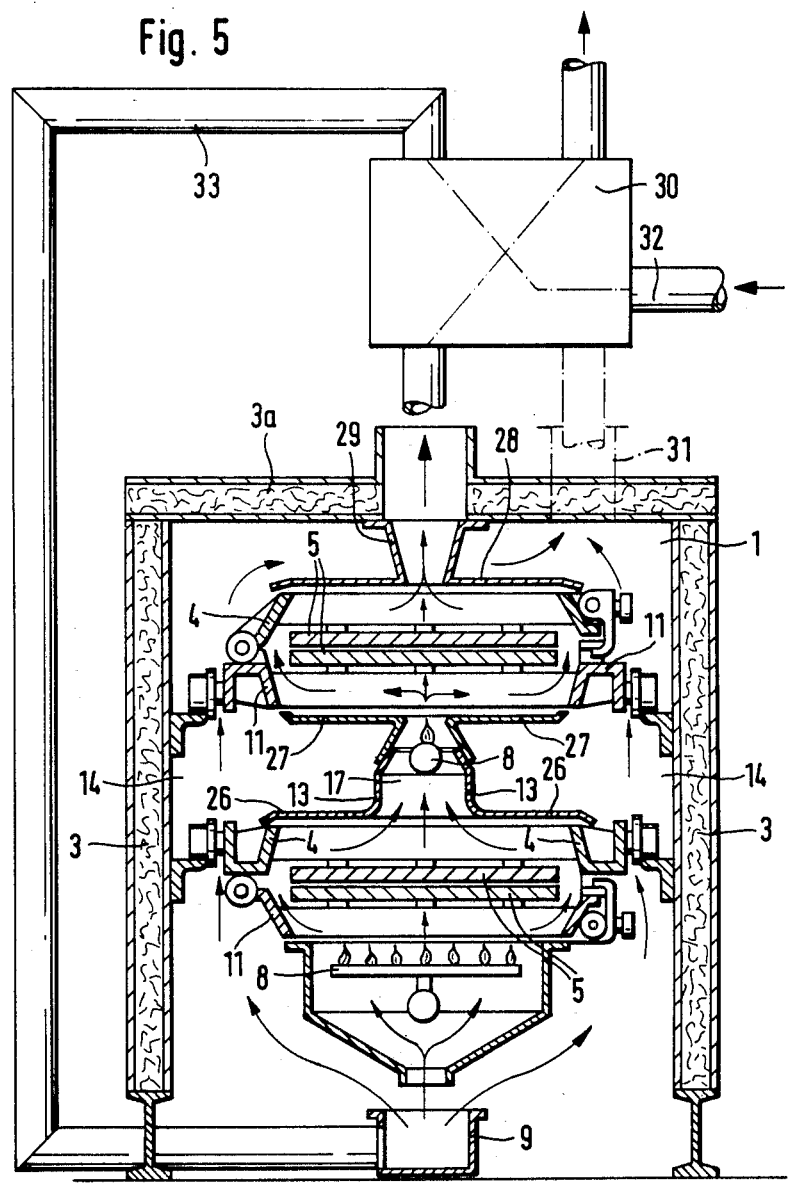
FIG. 5 is a view showing a section of a different embodiment of a wafer baking automatic machine in accordance with the present invention.

The wafer baking automatic machine in accordance with the embodiment of FIG. 5 differs from the machine of the first embodiment substantially in that it has the separating walls 13 located over the lower baking clamp 4 and a substantially horizontal wall portion 26 extending at a distance from their baking plates 5 so that the hot gas is forced to flow on the lower side of the baking plates 5 along the latter. The heating zone 17 in the region of the upper heating burner 8 is strongly narrowed. After passing the upper heating burners 8, similarly to the first embodiment the combustion air is supplied from outside, the hot gases flow along the lower side of the baking plates 5 located above the same, a horizontal wall portion 27 extends to the lower edges of the side parts 11 of the baking clamps 4.

Horizontal wall portions 28 are also provided at the upper side of the upper baking clamps 4 and guide the hot gas stream along the upper side of the baking clamps 5 to a central outlet 29. From there the hot discharge gases pass for example through a heat exchanger 30 which is also supplied with flushing air discharged from both lateral flushing zones 14 through an outlet 31 shown in FIG. 4.

A further supply conduit 32 can be connected with additional fresh air. The air preheated in the heat exchanger 30 is supplied through a conduit 33 of the air supply element 9 in the lower region of the baking chamber 1.

Figure 6:
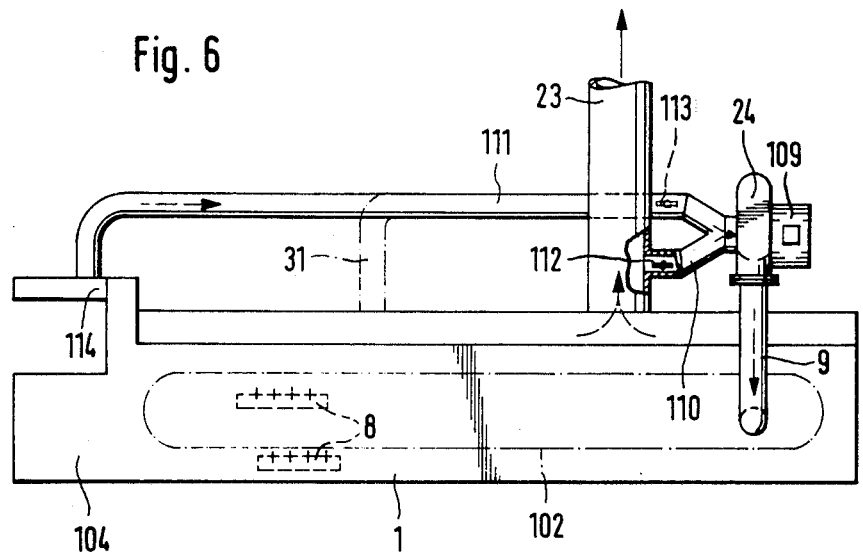
FIG. 6 is a view showing a very simplified longitudinal section of a wafer baking automatic machine of a further embodiment.

FIG. 6 shows a substantially simplified longitudinal section of a wafer baking automatic machine which has an almost completely closed baking chamber 1. An endless rotatable chain 102 of wafer baking clamps is arranged in the baking chamber 1 and identified in the drawing only with dash-dot lines. The wafer baking clamps rotating in the baking chamber 1 are heated by the burners 8.

A wafer baking discharge and dough pulling station 104 is arranged at the inlet of the baking chamber 1. In this station the wafer sheets are withdrawn from the opened baking clamps and subsequently the opened baking clamps are filled with wafer dough. The discharge gases produced from the burners 8 in the baking chamber 1 are discharged through the discharge gas outlet opening 23.

The air blower 24 supplies the baking chamber 1 via the air supply element 9 with a flushing air so that the bearings, the hinges and the pivots of the baking clamps, the chain 102 and their associated driving parts are cooled and the burners 8 are supplied with secondary air for a complete combustion. Moreover, the rinsing air serves for withdrawal of water vapors which take place during the baking process and the discharge produced by the burners 8 through the discharge gas outlet conduit 23.

An exhaust conduit 109 of the supply blower 24 is connected with a discharge gas suction conduit 110 communicating with the discharge gas outlet conduit 23 and with an air inlet conduit 111. Adjustable throttle flaps 112 and 113 are arranged in these both conduits. The air inlet conduit 111 is connected with an exhaust opening 114 arranged over the wafer sheet withdrawing and dough pulling station 104. Instead of this, the air inlet conduit 111 can be connected with the outlet 31 of the lateral flushing zones 14 and/or the fresh air channels 20 at the inner side of the housing side walls 3a, as shown in broken lines in FIG. 6.

In the above described example, 1300 Nm$^3$/h is aspirated via the wafer sheet discharge and dough pulling station 104 with approximately 21% of oxygen and temperature of 80° C. From the discharge gas outlet conduit 23, 2400 Nm$^3$/h of discharge gas-air mixture is withdrawn from the baking chamber 1 with approximately 200° C. and an oxygen content of approximately 18%. Approximately 200 Nm$^3$/h of pure discharge gas without oxygen is contained in the same. The flushing air is admixed through the discharge gas suction conduit 110 to substantially 900 Nm$^3$/h of discharge mixture so that the air mixture supplied by the air blower 24 to the baking chamber 1 in a quantity of approximately 2200 Nm$^3$/h has a temperature of approximately 145° C. and an oxygen content of approximately 19%.

This air mixture is completely sufficient for cooling of the support in the baking chamber 1, since the critical temperature of the support lies first in the region of substantially 200° C. Also, this air mixture as a secondary air for the burner 8 with a substantially lowered oxygen content is completely sufficient to provide for the desired complete combustion. Relative to the flushing air supply from the surrounding with a substantially 25° C. the heat losses of the wafer baking automatic machine is reduced by approximately 30%.

When it is desired, the discharge gas of the wafer baking automatic machine can be passed subsequently through an additional heat exchanger, for example to produce hot water for preheating the combustion air or also a gas-air mixture for the burner 8.

For accurate maintaining of the desired flushing air temperature, a not shown control device can be provided which adjusts the throttle flaps 112 and 113 in dependence on the flushing air temperature.

It will be understood that each of the elements described above, or two or more together, may also find a useful application in other types of constructions differing from the types described above.

While the invention has been illustrated and described as embodied in a wafer baking automatic machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A wafer baking automatic machine, comprising a housing including housing side walls and a housing cover together bounding a baking chamber; an endless rotatable chain of baking clamps each having two baking plates and side parts, said chain being movable in said baking chamber and having a lower chain portion and an upper chain portion, said side parts of said baking clamps of said lower chain portion having upper edges, said side parts of said baking clamps of said upper chain portion having lower edges; guiding means for said chain and including guiding rails and guiding rollers movable on said guiding rails; heating means including heating burners for heating said baking plates; air supply means provided in a lower region of said baking chamber; air discharge means provided in said housing cover; a separating wall provided in said baking chamber and extending from said upper edges of said side parts of said baking clamps of said lower chain portion to said lower edges of said side part of said baking clamps of said upper chain portion so as to subdivide said baking chamber into an inwardly located heating zone including said baking burners and said baking plates and an outwardly located flushing zone including said guiding rollers of said baking clamps and said guiding rails so that said guiding rollers are separated from said heating zone, said air supply means being open into said heating zone and into said flushing zone; air passages provided between said baking plates and said side parts of said baking clamps for passing hot air into said heating zone around said baking plates and inside said side parts, but not outside said side parts so that hot air does not pass in said flushing zone in the region of said guiding rollers; said side parts of said baking clamps of said lower chain portion having lower edges, and said separating wall having a lower wall portion extending from said heating burners to said lower edges of said side parts of said baking clamps of said lower chain portion.

2. A wafer baking automatic machine as defined in claim 1, wherein said baking clamps have clamp hinges and clamp locks, said clamp hinges and said clamp locks of said baking clamps being located outside of said side parts of said baking clamps in said flushing zone.

3. A wafer baking automatic machine as defined in claim 1; and further comprising means forming a substantially horizontal air collecting chamber extending along said housing cover, and means forming a cover intermediate chamber separating said air collecting chamber from said housing cover, said heating zone and said flushing zone being connected with said air collecting chamber.

4. A wafer baking automatic machine as defined in claim 3, wherein said housing side walls have inner sides; and further comprising fresh air channels covering said inner sides of said housing side walls and being open downwardly, said cover intermediate chamber being connected with said fresh air channels.

5. A wafer baking automatic machine as defined in claim 3, and further comprising a common mixing chamber with which said air collecting chamber and said cover intermediate chamber are connected, a discharge gas outlet means connected with said common mixing chamber, and an air blower through which said mixing chamber is connected with said air supply means.

6. A wafer baking automatic machine as defined in claim 3; and further comprising a heat exchanger connected with said air collecting chamber and arranged so that air withdrawn from said cover intermediate chamber and supplied to said air supply means is preheated in said heat exchanger.

7. A wafer baking automatic machine as defined in claim 1; and further comprising a heat exchanger connected with said heating zone and arranged so that air supplied to said air supply means is preheated in said heat exchanger.

8. A wafer baking automatic machine as defined in claim 1, wherein said baking plates include upper baking plates and lower baking plates, said separating wall includes horizontal wall portions extending at a distance from at least one of said upper and lower baking plates.

9. A wafer baking automatic machine as defined in claim 1 and further comprising an air inlet means, a discharge gas outlet means, a discharge gas suction means, and an air supply blower which opens in said baking chamber and has a suction conduit connected with said air inlet means and said discharge gas suction means.

10. A wafer baking automatic machine as defined in claim 9, wherein said flushing zone has an outlet, said air inlet means connected with said suction conduit of said air supply blower being connected with said outlet of said flushing zone.

11. A wafer baking automatic machine as defined in claim 9; and further comprising means forming wafer sheet discharge and dough pulling station with a suction opening located above the latter, said air inlet means connectd with said suction conduit of said air supply blower being connected with said suction opening.

12. A wafer baking automatic machine as defined in claim 9; and further comprising an adjustable throttling flap arranged at least in one of said discharge gas suction means and said air inlet means of said air supply blower.

* * * * *